United States Patent [19]

Thayer et al.

[11] Patent Number: 4,753,392
[45] Date of Patent: Jun. 28, 1988

[54] TWO DIMENSIONAL GAS TURBINE ENGINE EXHAUST NOZZLE

[75] Inventors: Edward B. Thayer, Jupiter; George H. McLafferty, North Palm Beach, both of Fla.

[73] Assignee: United Technologies Corporation, Hartford, Conn.

[21] Appl. No.: 667,708

[22] Filed: Nov. 2, 1984

[51] Int. Cl.[4] .................. F02K 1/12; F02K 1/62
[52] U.S. Cl. .................. 239/265.29; 239/265.33; 244/110 B; 60/230
[58] Field of Search .................. 239/265.19, 265.25, 239/265.27, 265.29, 265.33, 265.35, 265.39, 265.41; 60/226.2, 228, 229, 230; 244/12.5, 23 P, 110 B

[56] References Cited

U.S. PATENT DOCUMENTS

| | | | |
|---|---|---|---|
| 2,944,394 | 7/1960 | Peregrine | 239/265.29 |
| 3,684,183 | 8/1972 | Baerresen | 239/265.19 |
| 3,829,020 | 8/1974 | Stearns | 239/265.29 X |
| 3,837,411 | 9/1974 | Nash et al. | 239/265.29 X |
| 3,973,731 | 8/1976 | Thayer | 239/265.29 X |
| 4,052,007 | 10/1977 | Wellard | 239/265.29 |
| 4,183,478 | 1/1980 | Rudolph | 239/265.29 X |

FOREIGN PATENT DOCUMENTS 1435946 5/1976 United Kingdom .
2119325 11/1983 United Kingdom .

OTHER PUBLICATIONS

*Machine Design"*, vol. 55 (1983), Jan., No. 2, Cleveland, Ohio, pp. 78, 79.

Primary Examiner—Joseph F. Peters, Jr.
Assistant Examiner—Kevin Patrick Weldon
Attorney, Agent, or Firm—Stephen E. Revis

[57] ABSTRACT

A two dimensional exhaust nozzle for a gas turbine engine having reverse thrust capability includes a pair of spaced apart converging flaps which are able to rotate about their respective axes until their downstream edges meet along the engine centerline to block the flow of gases through the engine and to redirect the flow through fixed area reverser outlet ports. The axes about which each convergent flap rotates are spaced inwardly from their respective convergent flap surfaces. The flaps themselves cover the outlet ports when the flaps are in forward thrust operating positions. The flaps move away from and unblock the outlets as they rotate to their reverse thrust position. The distance between the flap axis and its convergent surface is critical to being able to use short flaps while obtaining large reverser outlet areas.

9 Claims, 3 Drawing Sheets

TWO DIMENSIONAL GAS TURBINE ENGINE EXHAUST NOZZLE

CROSS REFERENCE TO RELATED PATENT APPLICATION

The subject matter of this application is related to the subject matter of commonly owned U.S. patent application Ser. No. 667,707 filed Nov. 2, 1984 titled "Exhaust Nozzle Coupled with Reverser Exhaust Door" by William M. Madden, and U.S. patent application Ser. No. 667,709 filed Nov. 2, 1984 titled "Exhaust Nozzle With Improved Reverser Exhaust Door Mechanism" by Thomas A. Roach and Roy R. Starke, both filed on even day herewith.

TECHNICAL FIELD

The present invention relates to gas turbine engine exhaust nozzles.

BACKGROUND ART

Two dimensional variable area exhaust nozzles for gas turbine engines are well known in the art. One such exhaust nozzle is described in U.S. Pat. No. 4,310,121. Often two dimensional nozzles include thrust reversing capabilities as well as a variable nozzle exit area. Examples of such nozzles are shown in U.S. Pat. Nos. 4,013,226; 4,052,007; and 4,375,276. In recent years reduced nozzle weight, nozzle simplicity and nozzle compactness have become of greater concern. Improvements are continually sought in all of these areas. It is desirable, for example, to have as large a reverser exhaust outlet as possible for maximum efficiency of operation during reverse thrust. This area must be at least as large as the minimum forward thrust exhaust area to maintain constant engine airflow during reverse thrust operation. Achieving large reverser outlet areas has generally required larger exhaust nozzle flaps or the addition of complicated mechanism and heavy reverser doors.

DISCLOSURE OF INVENTION

One object of the present invention is a simple, lightweight variable area two dimensional nozzle having thrust reversing capability.

A further object of the present invention is a two dimensional exhaust nozzle which maximizes the reverser outlet area while simultaneously minimizing nozzle weight and size.

Yet another object of the present invention is a thrust reversing two dimensional exhaust nozzle wherein the thrust reversing exit area is significantly larger than the forward flight minimum exit area of the nozzle.

According to the present invention, a two dimensional exhaust nozzle includes opposed, spaced apart, rotatable converging flaps which pivot about respective axes spaced radially inwardly from the gas path surface of each flap, wherein the flaps act as doors across fixed area reverse thrust outlet ports when in forward thrust positions and unblock the outlet ports when in reverse thrust position while they simultaneously block the axial flow of gases through the nozzle.

More specifically, as the flaps rotate to a reverse thrust position their rearward edges meet along the engine centerline and the flap moves out of the thrust reverser outlet opening to allow the exhaust gases to flow therethrough. The distance of the flap axis of rotation from the flap gas path surface (hereinafter the "offset distance") is critical to being able to use the shortest possible flap while simultaneously obtaining the largest possible reverser outlet area. To obtain the largest reverser outlet area for a nozzle having a given minimum throat area while simultaneously keeping the flaps short requires selecting an "offset ratio" (the ratio of the offset distance to the distance of the flap surface from the nozzle axis when the flap is substantially parallel to the nozzle axis) between 0.2 and 0.4. With an offset ratio within that range, the reverse thrust outlet area can be at least about 1.15 times the forward thrust minimum throat area; however, with proper balancing of the flap, the offset ratio can be selected (within the above range) such that the reverse thrust outlet area will be at least 1.3 times the forward thrust minimum throat area.

If the offset ratio is outside of the critical range, either the flap must be made very long to obtain the same large reverser outlet area, or the reverser outlet area starts approaching and can even become smaller than the forward thrust minimum throat area, which is unacceptable as it could cause the engine to stall.

The foregoing and other objects, features and advantages of the present invention will become more apparent in the light of the following detailed description of preferred embodiments thereof as shown in the accompanying drawing.

BEST MODE FOR CARRYING OUT THE INVENTION

Figure 1:
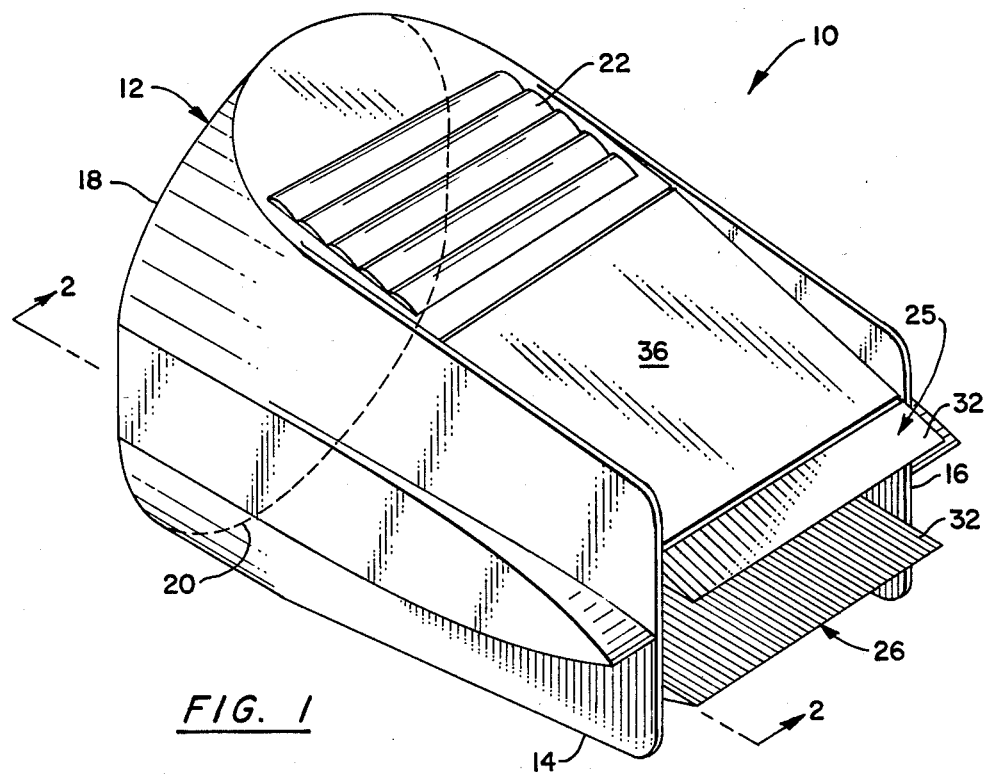
FIG. 1 is a perspective view of an exhaust nozzle incorporating the present invention.
Figure 5:
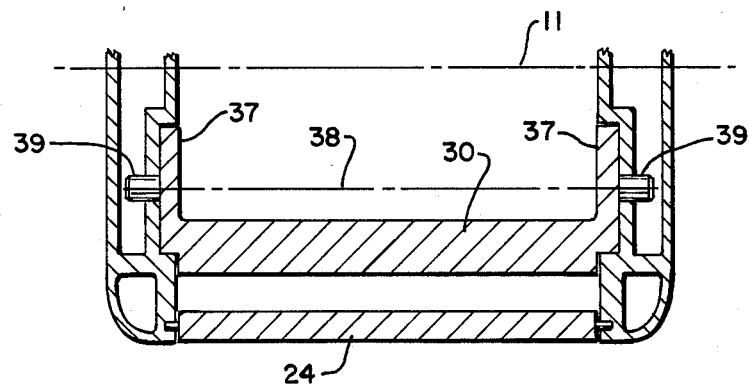
FIG. 5 is a cross sectional view, partly broken away, taken along the line 5—5 of FIG. 3.
Figure 2:
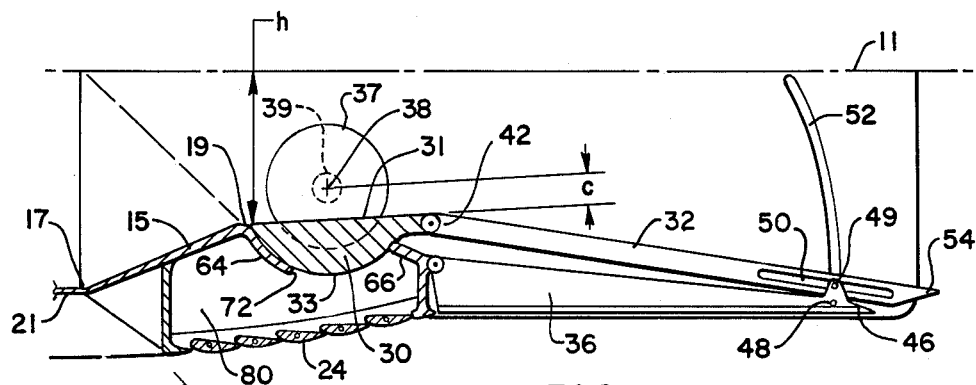
FIGS. 2 through 4 are simplified cross sectional views taken generally in the direction 2—2 of FIG. 1 showing the exhaust nozzle of the present invention in a maximum throat area, minimum throat area, and full thrust reversing position, respectively.

As an exemplary embodiment of the present invention consider the exhaust nozzle Assembly 10 shown in the perspective view of FIG. 1. The assembly 10 has a centerline 11 (FIG. 2) and comprises a housing generally represented by the reference numeral 12. The housing 12 includes a pair of spaced apart sidewalls 14, 16 which fair into an external transition duct 18. The duct 18 has a substantially circular inlet 20, shown as a broken line. Referring to FIG. 2, the assembly 10 also includes a gas path duct 15 which is substantially circular at its upstream end 17 and rectangular at its downstream end 19. The upstream end 17 mates with a circular duct 21 which defines the outlet of the gas flow path of the gas turbine engine (not shown) to which the exhaust nozzle assembly 10 is attached. Disposed within the housing 12 are upper and lower sets of louvers 22, 24, respectively, which are shown closed in FIGS. 1–3 and open in FIG. 4. The louvers 22, 24 are closed during forward thrust operation so as to present a smooth external fairing, and they are open during reverse thrust operation of the nozzle, as will be more fully explained hereinbelow.

The nozzle assembly 10 further includes upper and lower flap assemblies 25, 26, respectively, each comprising a convergent flap 30, a divergent flap 32, and an external fairing flap 36. The flaps 30, 32, and 36 each extend from the sidewall 14 to the sidewall 16. Each convergent flap 30 has a gas path defining flat rectangular inner surface 31 and a curved outer sealing surface 33. The flaps 30 are secured at each of their ends to discs 37 which are mounted within the sidewalls on shafts 39 for rotation about their respective axes 38. One or more actuators (not shown) rotate the shafts 39 and thus each flap 30. The precise means for mounting the flaps 30 within the sidewalls 14, 16 such that each rotates about its respective axis 38 is not important to the present invention and could be done in a variety of ways by persons having ordinary skill in the art.

The rearward end 46 of each external fairing flap 36 includes two pins 48, 49 extending outwardly from each side thereof and fixed thereto. The pins 49 pass through slots 50 in each side of the divergent flap 32, and pins 48 extend into sliding engagement with guide tracks 52 in each of the sidewalls 14, 16. The tracks 52 have a circular curvature having as their centers the axis of rotation of the fairing flap 36. The position of the forward edge 42 of the divergent flap 32 is controlled by the position of the convergent flap 30 to which it is attached. The position of the rearward edges 54 of the divergent flaps 32 are controlled by actuation systems separate from the system which rotates the flaps 30. The divergent flap actuation system is not shown or further described herein since the convergent flaps 32, the external fairing flaps 36, and the manner in which they move are not considered to be a part of the present invention. It is sufficient to say that each divergent flap 32 of the upper and lower flap assemblies 25, 26 are actuated independently, although in unison, to achieve variations in nozzle exit area as well as thrust vectoring.

The housing 12 includes a forward seal member 64 and a rearward seal member 66. The forward seal member 64 includes a curved sealing surface 68 which extends between the sidewalls 14, 16. The rearward seal member 66 has a straight sealing edge 65 also extending between the sidewalls 14, 16. The curvature of the seal member surface 68 and flap surface 33 is circular, with the center of curvature being on the axis 38. As the flap 30 rotates between its full forward thrust (i.e. reverser outlet completely closed) maximum throat area position shown in FIG. 2 and its full forward thrust minimum throat area position shown in FIG. 3 the forward edge 67 of the flap engages the surface 68 to provide a seal, while the straigt edge 65 of the seal member 66 engages the outer sealing surface 33 to provide a seal. In its minimum throat position (FIG. 3) the nozzle flap front edge 67 is nearly colinear with the rear edge 72 of the front sealing surface 68. In reverse thrust position (FIG. 4), the edge 72, in conjunction with the flap 30 and the sidewalls 14, 16 define a substantially rectangular outlet for the exhaust gases from the flow path. At that point the convergent flap rearward edge 74 is at the nozzle centerline 11 and is located af substantially the same axial position as the axis of rotation 38 of the flap. Throughout rotation of the flap 30 from minimum throat to full reverse thrust position the sealing member 66 remains in sealing relation with the outer surface 33 of the flap.

In this embodiment the reverse thrust outlet defined between the seal members 64, 66 is also the inlet to a chamber 80 located radially outwardly of the flap 30.

The chamber 80 is defined by the gap path duct 15, the housing 12, louvres 24 and seal members 64, 66. The louvres provide an outlet for the exhaust gases from the chamber 80 and can direct those exhaust gases over a wide range of directions which include either a forward or rearward thrust vector.

In case of nozzle actuator failure the gas pressure loads on the nozzle flaps must be such as to result in the nozzle failing in a forward thrust open position, rather than reverse thrust closed position. This is done by constructing the flap with a greater portion of its gas path surface area on the downstream side of the flap pivot axis 38. In other words, referring to FIG. 3, if the flap length (in the direction of gas flow) is l, and if y is that portion of the length l downstream of the pivot axis, and x is that portion of its length upstream of the pivot axis, then y must be greater than x for the flap to fail open.

Figure 3:
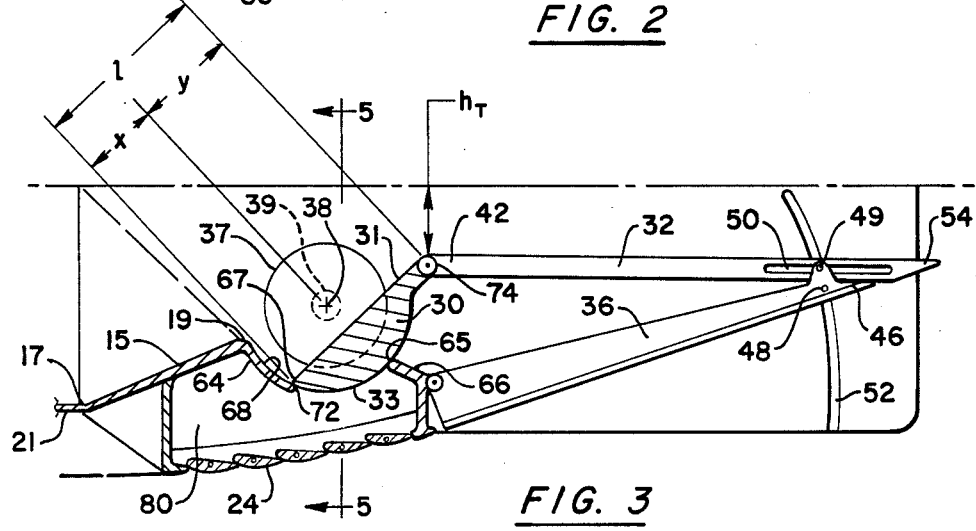
Figure 4:
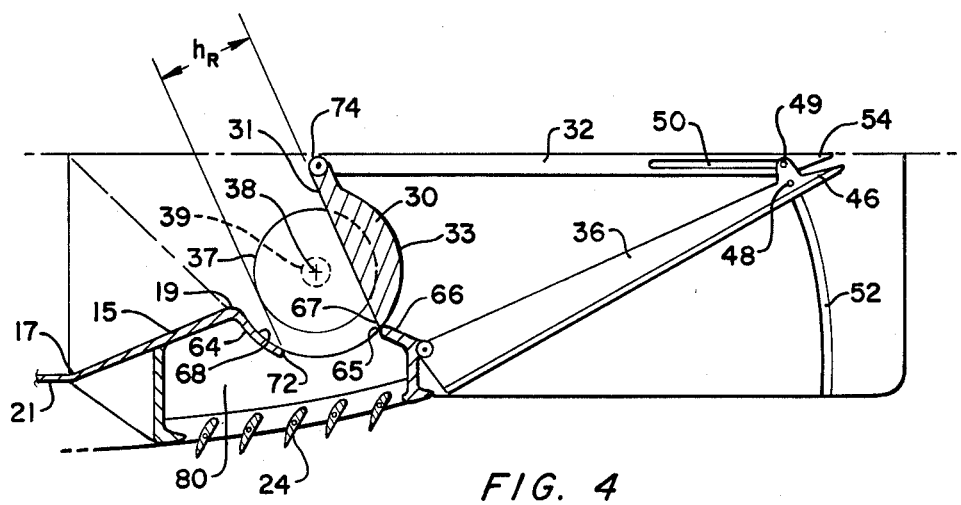

For purposes of describing the present invention, let h be the distance from the forward edge 67 of the flap 30 to the nozzle centerline 11 when the flap is in its maximum open, forward thrust position (FIG. 2). In that position the flap surface 31 is parallel to the nozzle centerline 11 or only slightly converging toward the centerline in the downstream direction. $h_T$ is the distance from the rearward edge 74 of the flap 30 to the nozzle centerline when the flap is in its minimum throat forward thrust position (FIG. 3). $A_e$ is the nozzle throat area. h and $h_T$ are directly proportional, respectively, to the maximum and minimum nozzle throat area for forward thrust positions of the nozzle. $A_e=0$ for reverse thrust. $A_R$ is the area of the reverse thrust outlet measured in a plane perpendicular to the flap surface 31 when the flap 30 is in the reverse thrust position. $A_R$ is directly proportional to $h_R$ (FIG. 4), which is measured from the seal member rear edge 72 to the plane of the surface 31 along a line perpendicular to the surface 31. c is the offset distance of the flap pivot axis 38 from the surface 31.

To discuss the present invention without regard to actual nozzle size, let s be a nondimensional number which is directly proportional to c as follows: $s=c/h$. If the pivot axis 38, is on the side of the flap not facing the gas path, then s will be a negative number. When s is 0, the pivot axis is located on the surface 31.

Figure 6A:
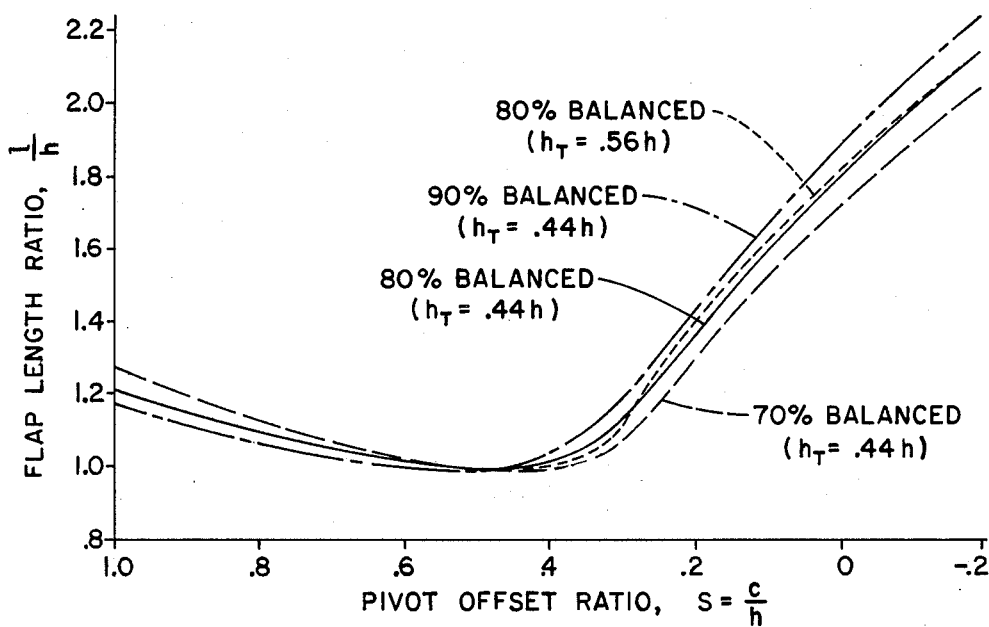
FIG. 6a is a graph showing the relationship of flap length to the location of the flap pivot axis.
Figure 6B:
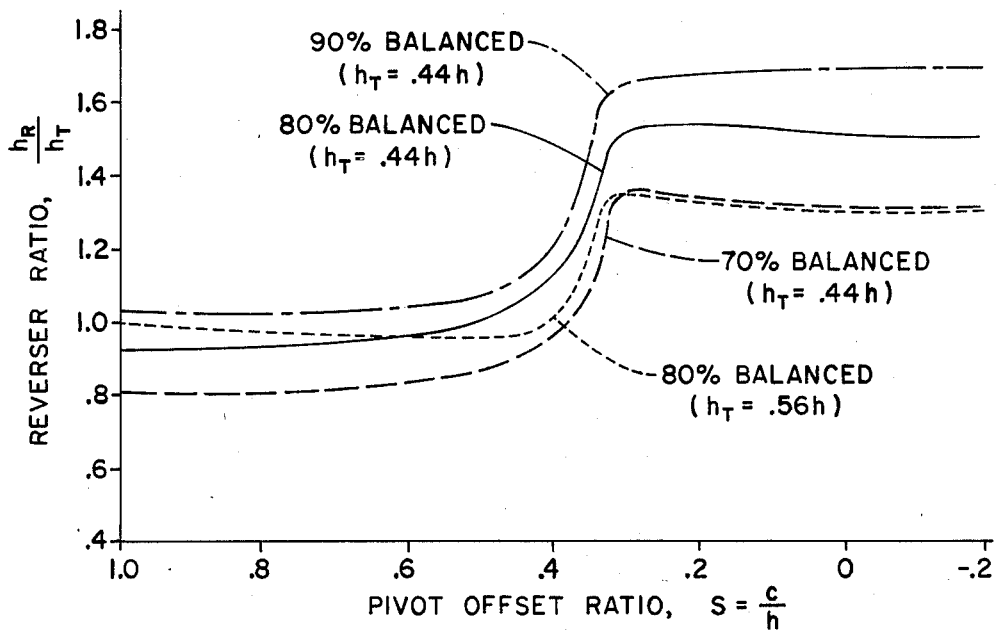
FIG. 6b is a graph showing the relationship of reverser outlet area to the location of the flap pivot axis.

It was discovered, quite unexpectedly, that, under certain conditions, a nozzle flap with an offset pivot as shown in the drawing can provide a large reverser outlet area relative to the forward thrust minimum throat area with a very short flap length l and without complex reverser door mechanisms. The graph of FIG. 6a plots a nondimensionalized flap length ratio (l/h) versus s when the nozzle minimum throat $h_T$ is 0.44 h, which is equivalent to a turndown ratio (maximum to minimum area $A_e$ for full forward thrust nozzle positions of 2.3. At $h_T=0.44h$, the flap length ratio is plotted for a 70% (i.e. $x=0.7y$), 80% (i.e. $x=0.8y$) and 90% (i.e. $x=0.9y$) balanced flap. Also plotted is the flap length ratio versus s for $h_T=0.56h$ (turndown ratio=1.8) when the flap is balanced at 80%. The graph of FIG. 6b plots the "reverser ratio" $h_R/h_T$ versus s under the same conditions as the graph of FIG. 6a. Suprisingly, between $s=0.3$ and $s=0.4$ the ratio $h_R/h_T$ drops suddenly and dramatically; and between about $s=0.2$ and 0.4, and especially between $s=0.25$ and 0.35 the flap length is quite short at the same time $h_R/h_T$ is large. (For an 80% balanced flap at $h_T=0.44$, the ratio $h_R/h_T$ is between 1.25 and 1.5 when s is within the range of 0.25 and 0.35.)

This phenomenon holds true for flaps balanced between 70% and 90%. Within that range of balancing, a value for s can be selected between 0.25 and 0.35 which will result in $h_R/h_T$ being at least 1.15 and preferably greater than 1.3; and the flap length will be no greater than about 1.3 times its smallest possible value.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A two-dimensional variable area gas turbine engine exhaust nozzle having thrust reversing capability, said nozzle including spaced apart side wall means and upper and lower flap assemblies connected to said side wall means defining an exhaut gas flow path within said nozzle, said nozzle having a centerline, each of said upper and lower flap assemblies comprising:

(a) stationary duct means extending between said side wall means, said duct means defining a forward sealing surface, said forward sealing surface having a front edge and a back edge, both extending between said side wall means;

(b) a nozzle flap extending between said side wall means and secured thereto for rotation about a stationary axis perpendicular to said side wall means through a range of full forward thrust positions and to a full reverse thrust position, said flap having an outer sealing surface and a flat inner surface for directing the flow of gas, said inner surface also facing and spaced from said flap axis of rotation by a perpendicular, distance c, said flap having a front edge and a rear edge, said front edge being a distance h from the nozzle centerline when the flap is in its maximum gas exit area full forward thrust position, and wherein the ratio c/h is between 0.2 and 0.4;

wherein said flap rear edges of said upper and lower flap assemblies and said side wall means together define a gas exit area $A_e$, said nozzle flap rear edges adapted to contact each other at the nozzle centerline in the full reverse thrust position such that $A_e=0$, said flap front edge being in sealing relation with said forward sealing surface in all full forward thrust positions, and when said area $A_e$ is the minimum area for full forward thrust said flap front edge is adjacent said rear edge of said forward sealing surface, and when said area $A_e=0$ said flap and said rear edge of said front sealing surface defines a reverser outlet having an area $A_R$ at least 1.15 times the minimum area $A_e$ for full forward thrust nozzle positions.

2. The exhaust nozzle according to claim 1, wherein the area $A_R$ is at least 1.3 times the minimum area $A_e$ for full forward thrust nozzle positions.

3. The exhaust nozzle according to claim 1 wherein the ratio of the flaps inner surface area upstream of the stationary axis to the flaps inner surface area downstream of the stationary axis when the flaps are in their maximum gas exit area forward thrust position are between about 70% and 90%.

4. The exhaust nozzle according to claim 3 wherein the ratio c/h is between 0.25 and 0.35.

5. The exhaust nozzle according to claim 3 wherein the ratio of the maximum gas exhaust exit area to the minimum gas exhaust exit area for forward thrust positions is between 1.8 and 2.3.

6. The exhaust nozzle according to claim 1 wherein the ratio of the flaps inner surface area upstream of the stationary axis to the flaps inner surface area downstream of the stationary axis when the flaps are in their maximum gas exit area forward thrust position are between about 80% and 90%.

7. The exhaust nozzle according to claim 1, wherein each of said upper and lower flap assemblies includes housing means defining a chamber located radially outwardly of the reverser outlet of the respective flap assembly, said reverser outlet being the chamber inlet for exhaust gases to said chamber when the nozzle is in any reverse thrust position, said housing means including rear sealing means extending between said side walls means, said rear sealing means being spaced rearwardly from said rear edge of said front sealing surface and being in sealing relation to said flap outer sealing surface as said nozzle rotates from a full forward thrust minimum exit rear position to a full reverse thrust position, said housing means also including means defining a chamber outlet, said chamber outlet means including flow directing means for directing exhaust gases away from said nozzle in a desired direction.

8. The exhaust nozzle according to claim 7, wherein said flap outer sealing surface includes a cylindrical surface portion extending between said side walls, the axis of the cylinder being coincident with said flap axis of rotation, said rear sealing means including a substantially straight edge extending between said side walls in sealing contact with said cylindrical surface portion throughout rotation of said flap at least from a full forward thrust minimum exit area position through a full reverse thrust position.

9. The exhaust nozzle according to claim 7 wherein $A_R$ is at least 1.3 times the minimum $A_e$ for full forward thrust nozzle positions, the ratio of the flaps inner surface area upstream of the stationary axis to the flaps inner surface area downstream of the stationary axis when the flaps are in their maximum gas exit area forward thrust position are between about 70% and 90%, and the ratio of the maximum gas exhaust exit area to the minimum gas exhaust exit area for forward thrust positions is between 1.8 and 2.3.

* * * * *